J. A. FINK.
VALVE SPRING LIFTER.
APPLICATION FILED DEC. 22, 1920.
1,433,502.
Patented Oct. 24, 1922.
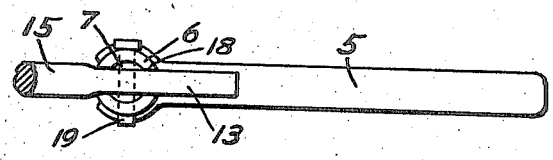
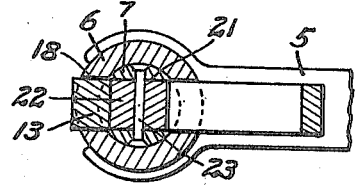
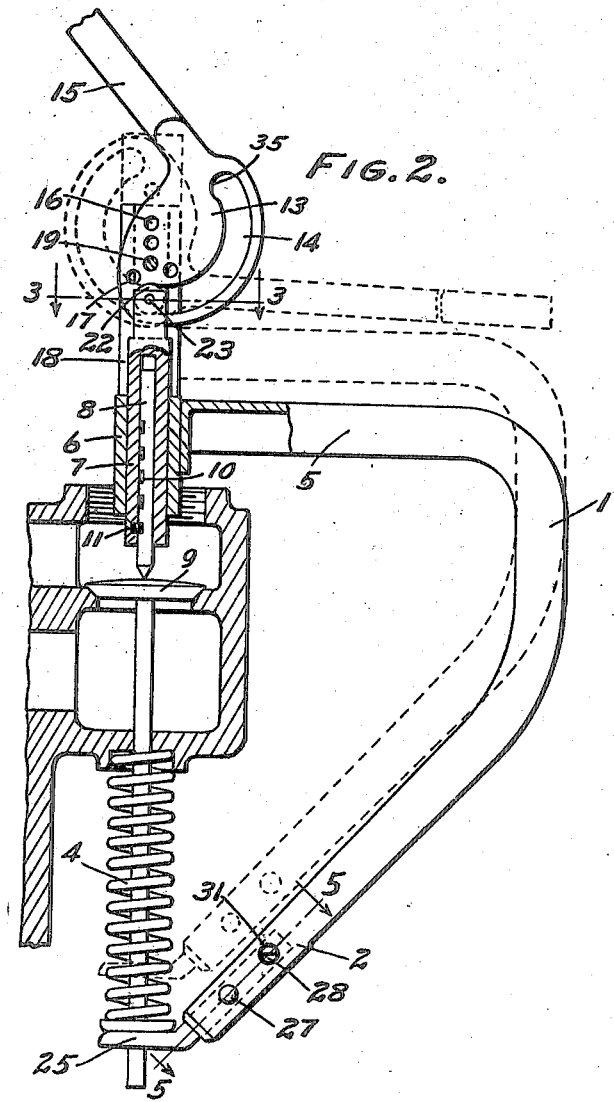
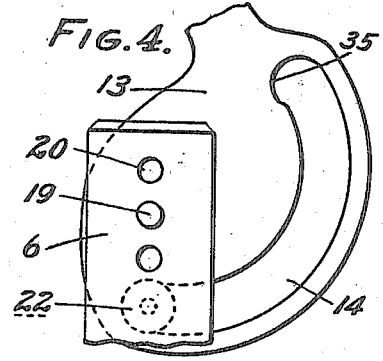
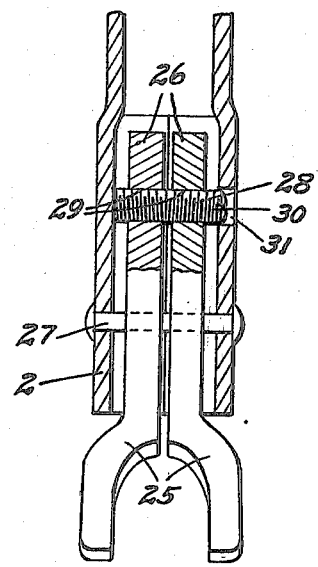
INVENTOR
JOHN A. FINK
BY Hazard & Miller
ATT'YS.

Patented Oct. 24, 1922.

1,433,502

UNITED STATES PATENT OFFICE.

JOHN ALPHA FINK, OF SANTA BARBARA, CALIFORNIA.

VALVE SPRING LIFTER.

Application filed December 22, 1920. Serial No. 432,557.

*To all whom it may concern:*

Be it known that I, JOHN ALPHA FINK, a citizen of the United States, residing at Santa Barbara, in the county of Santa Barbara and State of California, have invented new and useful Improvements in Valve-Spring Lifters, of which the following is a specification.

This invention is a valve spring lifter and has for its object the provision of improved cam operating means so arranged that the pivotal connection for said cam may be readily adjusted.

It is a further object of the invention to provide means for adjusting the length of the valve head engaging member and for locking the same in adjusted positions.

It is a still further object of the invention to provide an adjustable yoke for engaging the valve spring.

The invention will be readily understood from the following description of the accompanying drawings, in which:

Figure 1 is a plan view of the valve spring lifter.

Fig. 2 is a side elevation of the same in use and showing in dotted lines the position of the device when the valve spring has been compressed.

Fig. 3 is a detail section on the line 3—3 of Fig. 2.

Fig. 4 is a side elevation showing the cam lever and the standard to which it is pivoted.

Fig. 5 is a detail section on the line 5—5 of Fig. 2.

The valve spring lifter comprises a frame 1 having lower end 2 carrying a yoke adapted to engage beneath a usual valve spring 4, and an upper end 5 arranged as a lateral arm and terminating in a bearing standard 6 in which is slidable a member 7 having a pin 8 adapted to engage valve head 9 in usual manner. The slidable member 7 is moved up and down in the bearing standard by cam lever operating means so as to compress the spring 4 in usual manner.

The pin 8 is preferably adjustable in the bore of member 7, and for this purpose is provided with longitudinally spaced notches 10 any one of which is adapted to be engaged by a set screw 11 extending through member 7 so as to axially adjust the pin.

The cam lever is shown as a cam plate 13 having the cam slot 14 and the actuating arm 15. The cam plate is provided with a plurality of alined apertures 16 in any one of which a pivot pin for the cam is adapted to be received in order to adjust the position of the pivot for the cam. If found desirable additional apertures 17 may be provided in the cam plate out of alinement with the row of apertures 16, and arranged to receive the pivot pin for the cam in order to provide additional adjustments of the pivot point for the cam. The upper end of the bearing standard is longitudinally slotted as shown at 18, and the cam plate is received in this slot with a pivot pin 19 extending through any one of the openings 16 or 17, and through suitable openings in the respective sides of the slotted standard. A plurality of such openings as shown at 20 may be provided in the sides of the standard lengthwise thereof in order to provide for adjustment of the cam pivot relative to the bearing standard.

The upper end of member 7 is slotted as shown at 21, so that the cam plate may be received in said slot, and a roller 22 is pivoted upon a pin 23 in the slot 21 so as to be received within the cam slot 14. By this arrangement it will be seen that turning of the cam upon its pivot from its position shown in full lines in Fig. 2 to the position shown in dotted lines will elevate the bearing standard and frame 1 relative to member 7.

The adjustable yoke provided upon arm 2 of the frame includes a longitudinally split yoke forming yoke members 25 having their shanks 26 received within the hollow end of arm 2. The shanks are laterally adjustable relative to one another, and are slidably supported upon a transverse pin 27 carried by arm 2. A screw 28 having its ends reversely threaded makes threaded engagement in apertures 29 extending through the respective shanks 26, so that rotation of the screw in opposite directions will adjust the position of the yoke members relative to one another. The head 30 of screw 28 is in alinement with an opening 31 formed in arm 2 in order that the screw may be readily engaged for rotating the same.

The construction as thus set forth provides an improved cam operated valve spring lifter in which the degree of movement obtained by the device may be readily adjusted, and in which the valve head engaging part of the lifter, as well as the valve spring engaging part, may be adjusted so as to be employed in connection with valves and springs of different sizes.

If found desirable, the device may be arranged so as to provide for releasably holding the parts in position with the valve spring compressed. For this purpose the end of cam slot 14 may be enlarged so as to form offset 35 in which the roller 22 is received when the cam has been actuated. This offset is so arranged as to automatically engage the roller, but readily release the same when appreciable pressure is applied, so that the valve spring lifter will retain the spring compressed when so desired, and will also quickly release the same.

Various changes may be made without departing from the spirit of the invention as claimed.

What is claimed is:

1. A valve spring lifter comprising a frame, a valve engaging yoke at the lower end thereof, a bearing at the upper end of the yoke, a member arranged for sliding movement through the lower portion of said bearing, a valve engaging pin adjustably carried by said sliding member, and a slotted cam pivotally mounted on the upper portion of the bearing at the upper end of the frame, the slot in which cam receives a part of the slidable member.

2. A valve spring lifter comprising a frame, a valve engaging yoke at the lower end thereof, a bearing at the upper end thereof, parallel arms extending upwardly from said bearing, a member arranged for sliding movement through said bearing, a valve engaging pin adjustably carried by said sliding member, and a member adjustably mounted between the upper portions of said upwardly projecting arms and engaging the upper portion of the sliding member, so as to move the same through the bearing when said pivotally mounted member is actuated.

3. In a valve spring lifter, a frame, a bearing at one end thereof, a member arranged for sliding movement through said bearing, a valve engaging pin adjustably seated in said sliding member, a slotted cam fulcrumed on the upper portion of said bearing, and a roller carried by said sliding member, which roller is positioned in the slot in said cam.

4. A valve spring lifter comprising a frame having a valve engaging yoke at its lower end, a bearing standard at its upper end, a valve head engaging member slidable therein, a roller journaled in said member, and a lever pivoted to said standard and having a cam slot therein in which said roller is received.

5. A valve spring lifter comprising a frame having a valve engaging yoke at its lower end, a bearing standard at its upper end, a member slidable therein, a valve engaging pin adjustably seated in said sliding member, a cam lever pivoted to said standard and operatively engaging said valve head engaging pin, and means for adjusting the position of the lever pivot.

6. A valve spring lifter comprising a frame having a valve engaging yoke at its lower end, a bearing standard at its upper end, a member slidable therein, a valve engaging pin adjustably seated in said sliding member, and a cam lever pivoted to said standard and operatively engaging said valve head engaging pin, said operative engagement arranged to releasably retain the lifter in actuated position.

7. A valve spring lifter comprising a frame having a valve engaging yoke at its lower end, a bearing standard at its upper end, a valve head engaging member, and a lever pivoted to said standard and having a cam slot therein in which said roller is received, the end of said cam slot having an offset adapted to releasably engage the roller.

In testimony whereof I have signed my name to this specification.

JOHN ALPHA FINK.